US008838689B2

(12) United States Patent
Chen et al.

(10) Patent No.: US 8,838,689 B2
(45) Date of Patent: Sep. 16, 2014

(54) SECURED AND EFFICIENT WEB CONFERENCE SYSTEM WITH VIRTUAL HOST AND REDUNDANCY CONTROL (75) Inventors: Li-Ju Chen, Taipei (TW); Chih-Wen Su, Taipei (TW); Richard Y F Tsai, New Taipei (TW); Meng Li Wong, Taipei (TW); Ying-Chen Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/118,979

(22) Filed: May 31, 2011

(65) Prior Publication Data
US 2012/0011249 A1 Jan. 12, 2012

(30) Foreign Application Priority Data
May 31, 2010 (TW) ................. 99117481 A (51) Int. Cl.
G06F 15/16 (2006.01)
(52) U.S. Cl.
USPC ............................ 709/204; 370/216; 370/260
(58) Field of Classification Search
None
See application file for complete search history.

(56) References Cited

U.S. PATENT DOCUMENTS

| 5,949,414 A | 9/1999 | Namikata |
| 5,960,395 A * | 9/1999 | Tzirkel-Hancock .......... 704/241 |
| 6,298,346 B1 | 10/2001 | Kurosawa |
| 6,349,136 B1 | 2/2002 | Light et al. |
| 6,584,493 B1 * | 6/2003 | Butler .......................... 709/204 |
| 6,948,088 B1 | 9/2005 | Sharan |
| 7,149,298 B2 | 12/2006 | Fernandes et al. |
| RE39,717 E * | 7/2007 | Yates et al. .................... 709/201 |
| 7,330,541 B1 | 2/2008 | Surazski et al. |
| 7,492,729 B2 | 2/2009 | Shaffer et al. |
| 8,447,809 B2 | 5/2013 | Chang et al. |
| 2004/0080504 A1 * | 4/2004 | Salesky et al. ................ 345/418 |
| 2005/0273510 A1 * | 12/2005 | Schuh .......................... 709/225 |
| 2008/0005244 A1 * | 1/2008 | Vernon et al. ................. 709/204 |
| 2008/0126481 A1 * | 5/2008 | Chakra et al. ................. 709/204 |
| 2008/0133660 A1 * | 6/2008 | Salesky et al. ................ 709/204 |
| 2008/0159490 A1 * | 7/2008 | Gaudin et al. ............. 379/88.16 |
| 2008/0212499 A1 * | 9/2008 | Maes ............................ 370/265 |
| 2008/0244461 A1 * | 10/2008 | Kropivny ...................... 715/856 |
| 2008/0275955 A1 * | 11/2008 | Yamazaki et al. ............ 709/205 |

(Continued)

FOREIGN PATENT DOCUMENTS

| CN | 101286861 A | 10/2008 |
| CN | 101521588 A | 9/2009 |
| WO | WO 2009109657 A2 * | 9/2009 |

*Primary Examiner* — Ian N Moore
*Assistant Examiner* — Eric P Smith
(74) *Attorney, Agent, or Firm* — Jordan IP Law, LLC (57) ABSTRACT

A web conferencing server, including a conferencing module, a monitoring module and a control module, is provided. The conferencing module enables a plurality of participants to attend a web conference and further provides a first participant with a conference right, which allows the first participant to issue a conference command. The monitoring module monitors the status of the first participant in order to generate a status notification. In response to the status notification, the control module issues a control command to the conferencing module, to withhold the conference right from the first participant.

22 Claims, 8 Drawing Sheets

(56) References Cited

U.S. PATENT DOCUMENTS

2009/0006608 A1* 1/2009 Gupta et al. ............. 709/224
2009/0019526 A1 1/2009 Fukushima
2009/0030709 A1* 1/2009 Arbajian ..................... 705/1
2009/0220064 A1* 9/2009 Gorti et al. ............ 379/202.01
2009/0222518 A1 9/2009 Chang et al.
2009/0287828 A1* 11/2009 Wei et al. ................. 709/227
2009/0292999 A1* 11/2009 LaBine et al. ............. 715/740
2009/0319913 A1* 12/2009 Serr et al. ................. 715/753

* cited by examiner

SECURED AND EFFICIENT WEB CONFERENCE SYSTEM WITH VIRTUAL HOST AND REDUNDANCY CONTROL

BACKGROUND OF TILE INVENTION

1. Field of the Invention

The present invention relates to a web conferencing server and a method of holding a web conference.

2. Description of the Prior Art

Web conferencing or webinar enables participants based at different places to attend a conference held online. Existing web conferencing tools include IBM's LOTUS®, SAMETIME®, and UNYTE® ("LOTUS," "SAMETIME," and "UNYTE" are registered trademarks in the possession of IBM in the United States and/or other countries), Cisco's WEBEX® ("WEBEX" is a registered trademark in the possession of Cisco in the United States and/or other countries), and Microsoft's NETMEETING® (NETMEETING is a registered trademark in the possession of Microsoft in the United States and/or other countries). The particulars of IBM's UNYTE® are available at ***conferenceservers.com/docs/user/?brand=SametimeUnyteMeetingPro, and thus are not repeatedly described herein for the sake of brevity.

In general, each of the existing web conferencing tools provides a virtual conference room and enables conference participants to enter the virtual conference room to chat therein online. However, given a large number of participants (which total in hundreds or thousands, for example), it will be necessary that the conference should be smoothly held and will not be impeded by a specific participant's problem. The aforesaid necessity is of vital importance, especially when the specific participant happens to be the chairperson or a participant in charge of a specific duty.

SUMMARY OF THE INVENTION

One aspect, the present invention is to prevent a web conference from being impeded by a specific participant's problem, especially when the specific participant happens to be the chairperson or a participant in charge of a specific conference management right. For example, the present invention prevents a web conference from being impeded as a result of a sudden interruption of a specific participant's connection or the chairperson's connection, a specific participant's interference behavior (for example, not switching to the mute status), or any other technical glitch.

In an embodiment, a web conferencing server includes a conferencing module, a monitoring module, and a control module. The conferencing module enables a plurality of participants to attend a web conference and provides a conference right to a first participant of the plurality of participants. The monitoring module is connected to the conferencing module and is configured to monitor a status of the first participant in order to generate a status notification. The control module is connected to the conferencing module and the monitoring module and is configured to issue, in response to the status notification, a control command to said conferencing module, to withhold the conference right from the first participant.

In another embodiment, the method for holding a web conference includes the following steps: identifying a plurality of participants for attending the web conference, the plurality of participants including a first participant; providing a conference right to the first participant; monitoring a status of the first participant in order to generate a status notification; and withholding the conference right from the first participant in response to the status notification.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Further, please note that the terms—"the first participant", "the second participant", and "the third participant"—in this specification and claims are provided for referring to different participants, and they have nothing to do with the sequence when those participants login to the web conference. For example, "the first participant" can login to the web conference before or after "the second participant"; "the second participant" can login to the web conference before or after "the third participant".

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a server, a client device, a method, or a computer program product. Accordingly, the present invention may take the form of an entirely hardware embodiment, a software embodiment (including firmware, resident software, micro-code, etc.) executable by a processor, such as is found in a computer, or an embodiment combining software and hardware aspects that may all generally be referred to herein as a "circuit," "module" or "system." Furthermore, the present invention may take the form of a computer program product embodied in any tangible storage device having computer-usable program code embodied therein.

Any combination of one or more computer usable or computer readable medium(s) may be utilized. The computer-usable or computer-readable medium/may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, and communicate the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
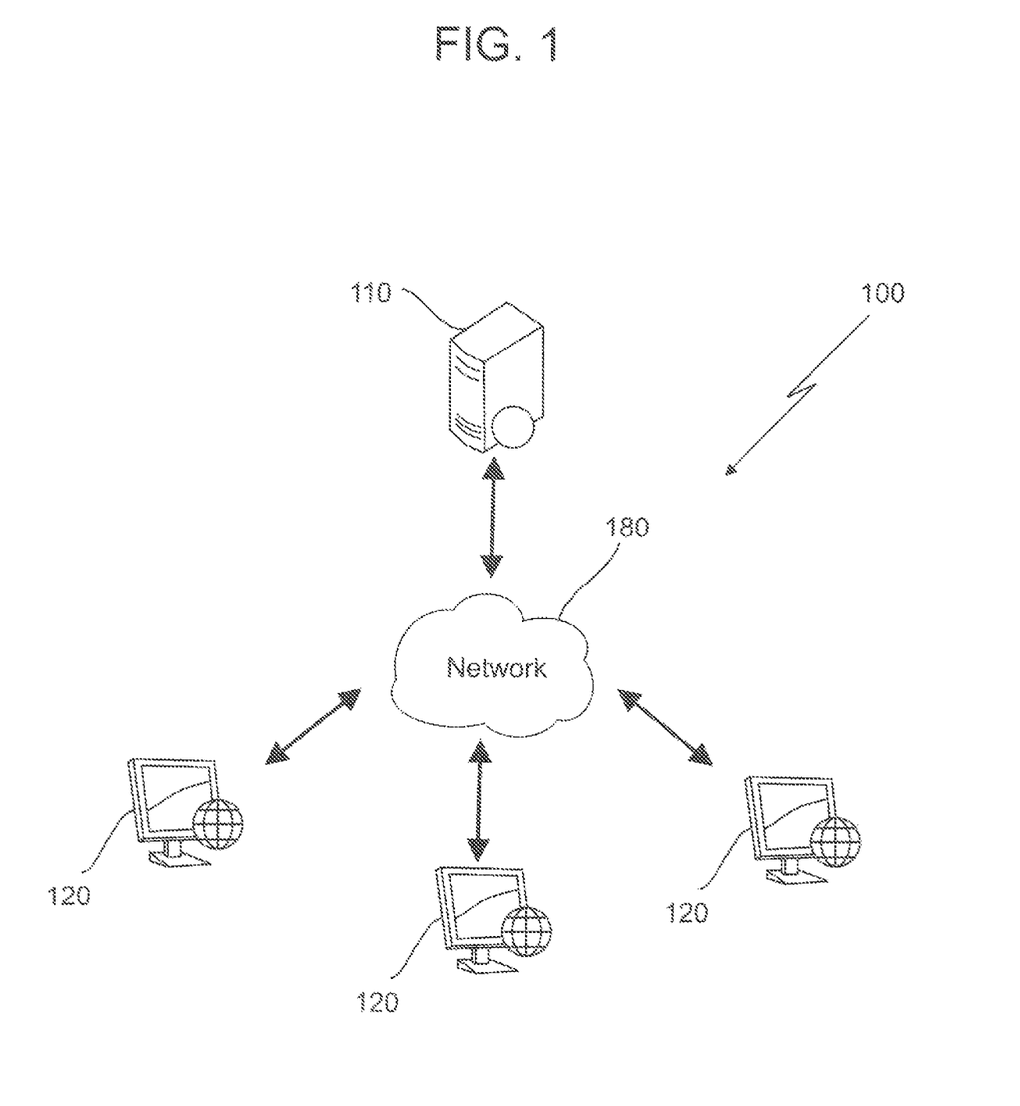
FIG. 1 is a block diagram of a web conferencing system according to an embodiment of the present invention.

FIG. 1 is an exemplary diagram of web conferencing system 100 according to an embodiment of the present invention. The system 100 includes one or more servers 110 and one or more client devices 120, such as desktop, laptop, mobile device, etc. A server 110 is in communication with a client device via a network 180. The network 180 can be any type of network such as the Internet, a local area network (LAN), a wide area network (WAN), a virtual private network (VPN), etc. In any event, communication between the server 110 and the client device 120 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In addition, it should be understood, however, that although not shown, other hardware and software components (e.g., additional computer systems, routers, firewalls, etc.) could be included in the network 180.

Figure 2:
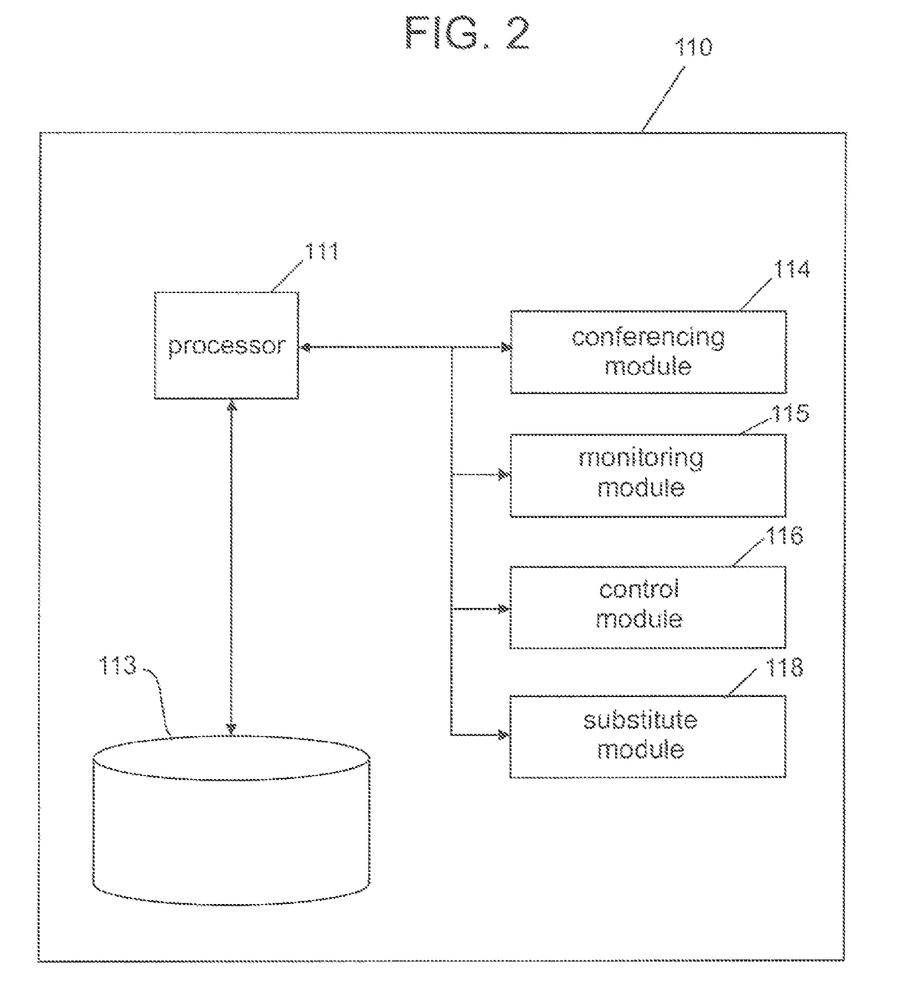
FIG. 2 is a block diagram of a web conferencing server according to an embodiment of the present invention.

FIG. 2 shows the server 110 according to an embodiment of the present invention. As shown, the server 110 has a processor 111 and a storage device 113. In addition, the server 110 can have buses, I/O interface, input or output devices (such as keyboard and display), memories, caches, a communication system, and server software, all of which are not shown in the drawings. The processor 111 could be a processor for the general information service server, such as Xeon® of Intel Corporation, and Athlon® or Opteron® of Advanced Micro Devices. ("Xeon" is a registered trademark of Intel Corporation in the United States, other countries, or both.) "Athlon" and "Opteron" are registered trademarks of Advanced Micro Devices, Inc. in the United States, other countries, or both.) Note that the server 110 may have more than one processor 111. The storage device 113 can comprise one or more storage devices such as a hard disk drive or an optical disk drive. In another embodiment, the storage device 113 can have data spread in a LAN, a WAN or a SAN, for example. The processor 111 executes an application program to provide a first parser module (conferencing module) 114, a second parser module (monitoring module) 115, a determination module (control module) 116, and a substitute module 118. Meanwhile the processor 111 can access or read/write to/from a storage module in the storage device 113.

Figure 3:
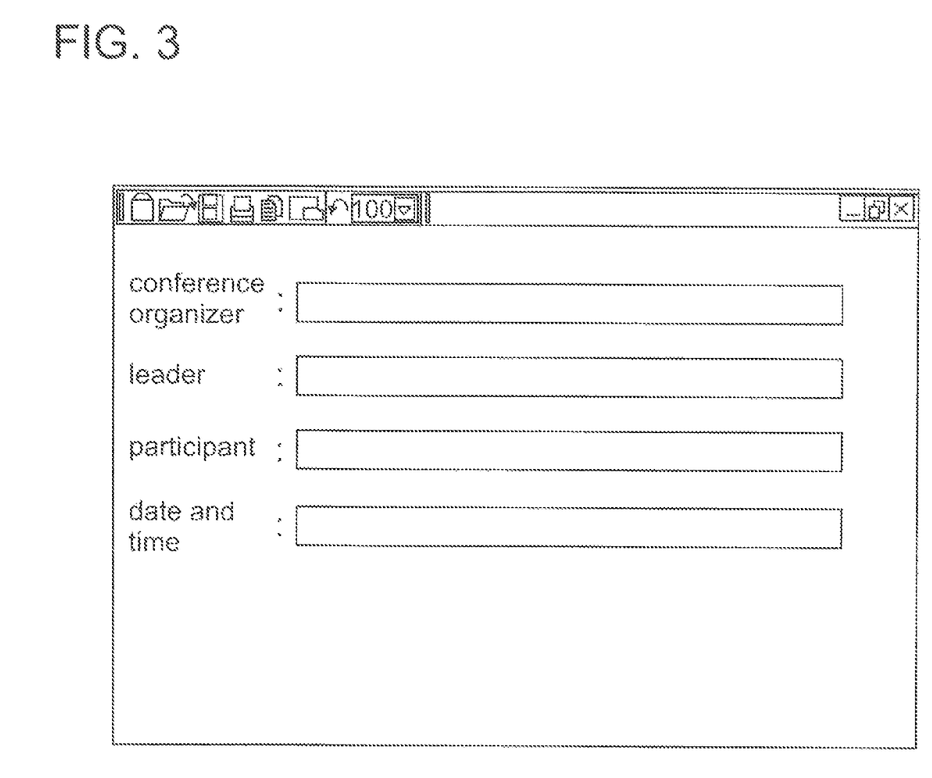
FIG. 3 is a view of a user interface showing a conference setting interface according to an embodiment of the present invention.

A conferencing module 114 enables a plurality of participants to get connected and log into a server 110 so as to attend a web conference. The conferencing module 114 provides a conference setting interface (as shown in FIG. 3) for a conference organizer. The conference organizer sets a conference time and creates a list of conference participants with the conference setting interface.

In general, the conferencing module 114 provides the conference organizer (i.e., the chairperson, in most cases) with a plurality of conference rights for controlling the process of the conference. According to the present invention, the "conference rights" herein enable participants (including the conference organizer) to issue specific commands or messages to the conferencing module 114 or other participants for the sake of a web conference. The conference organizer is entitled to conference rights of managing a conference generally, sending participants a message related to the commencement of a conference, a break, or the end of a conference, granting a participant the controlling authority to deliver a presentation, sending conference-related data to participants, permitting a participant to make a statement, muting a participant, evicting a participant, or granting specific conference rights to participants at a conference impromptu. A point to note is that the conference rights may be given to the conference organizer exclusively or non-exclusively.

Figure 4:
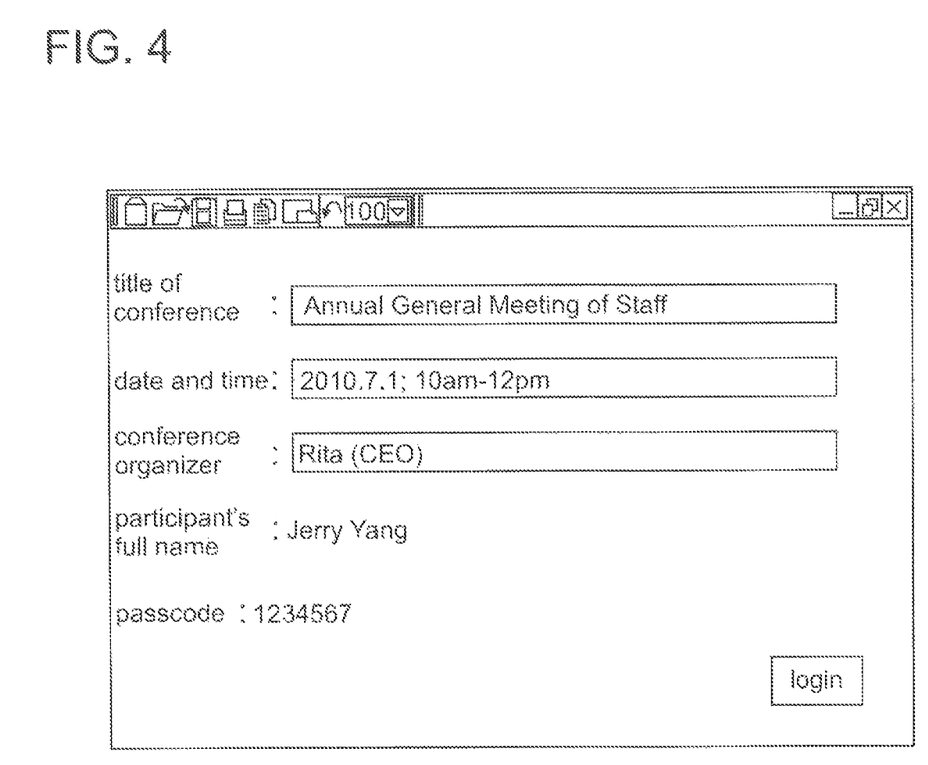
FIG. 4 is a view of a user interface showing an invitation according to an embodiment of the present invention.

After the conference organizer has completed the conference setting, the conferencing module 114 sends an invitation (as shown in FIG. 4) to would-be participants by email. The invitation provides a connection means, such as a button in which the URL of web conferencing is embedded. With a client device 120 in his or her possession, each of the participants can log into a web conferencing server 110 on time to attend the conference. The particulars of the above are described in the user manuals of IBM's LOTUS®, SAMETIME®, and UNYTE® [collaboration utilities], and thus are not reiterated herein for the sake of brevity. A point to note is that the conferencing module 114 gives an exclusive passcode to each conference participant. To log into the server 110, each of the participants has his or her identity verified with his or her own passcode, so as to enhance the security of the conference. In addition to the passcode, the conferencing module 114 in other embodiments verifies participants' identity by video or audio data (such as participants' image or voice) transmitted from participants' said client device 120 to the server 110. However, the above disclosure should be regarded as alternative embodiments of the present invention, but is not restrictive of the present invention.

Conference rights are provided not only to the conference organizer but also to other participants. In an embodiment not shown, the conference organizer grants rights to specific participants beforehand, using the conference setting interface provided by the conferencing module 114, and the conferencing module 114 provides corresponding conference rights to specific participants accordingly. For example, acting in the capacity of the conference organizer (i.e., chairperson, in this case), the general manager of a company invites whole staffs of the company to participate in a conference. Given a large number of participants, the conference organizer (general manager) makes reference to the company's organizational structure (as provided by the human resources department in advance), appoints the company's department heads (who are also conference participants) as "conference leaders" beforehand, and grants appropriate conference rights to the leaders, allowing the leaders to give instructions or assistance to their respective departments' employees at the conference.

The conferencing module 114 provides the department heads (who are also the conference leaders) with conference rights related to their departments, respectively, such as the conference rights of sending reference materials to participants affiliated with the departments, muting the department-affiliated participants, evicting the department-affiliated participants, granting other specific conference rights to the department-affiliated participants at a conference impromptu, holding internal seminars with attendance limited to the department-affiliated participants, holding a vote on a resolution with attendance limited to the department-affiliated participants, or sending specific messages (such as, one confirms that all the department-affiliated participants are present at the conference) to the conference organizer (general manager) on behalf of the departments.

With the conferencing module 114, the conference organizer can provide participants in general with other conference rights, such as the conference right of making a statement or the conference right of casting a vote. Also, for example, a variety of conference rights can be granted, depending on the departments with which the participants are affiliated.

In an unrestrictive embodiment, the conference organizer (general manager) enjoys more conference rights than the leaders (department heads) do, and the leaders (department heads) enjoy more conference rights than ordinary participants do. However, the leaders differ in conference rights, and so do ordinary participants. For example, some participants are entitled to the conference right of making a statement but not entitled to the conference right of casting a vote; however, the opposite is true for other participants.

Furthermore, in the aforesaid embodiment, between participants is a predetermined hierarchical relationship (e.g., based on a company's organizational structure) which is usually defined with a hierarchical-tree structure. For example, from a corporate management perspective, the two extremes of a multilevel corporate architecture are represented by the general manager at the highest level and the employees at the lowest level, respectively, wherein the different levels correlate by a vertical association (such as, a reporting line) in a hierarchical-tree structure. In other organizational structures, the relationship between members at different levels can usually be described by the hierarchical-tree structure for the sake of management.

In this embodiment, the hierarchical-tree structure for correlating conference participants is stored in an existing database (for example, a company's human resources database not shown) in advance. Alternatively, the hierarchical-tree structure is edited by the conference organizer and then stored in a database (not shown) of the server 110 for future access by the conferencing module 114. The conferencing module 114 can either directly apply the hierarchical-tree structure stored in the human resources database or edit/simplify the hierarchical-tree structure for conferencing purpose.

Figure 5:
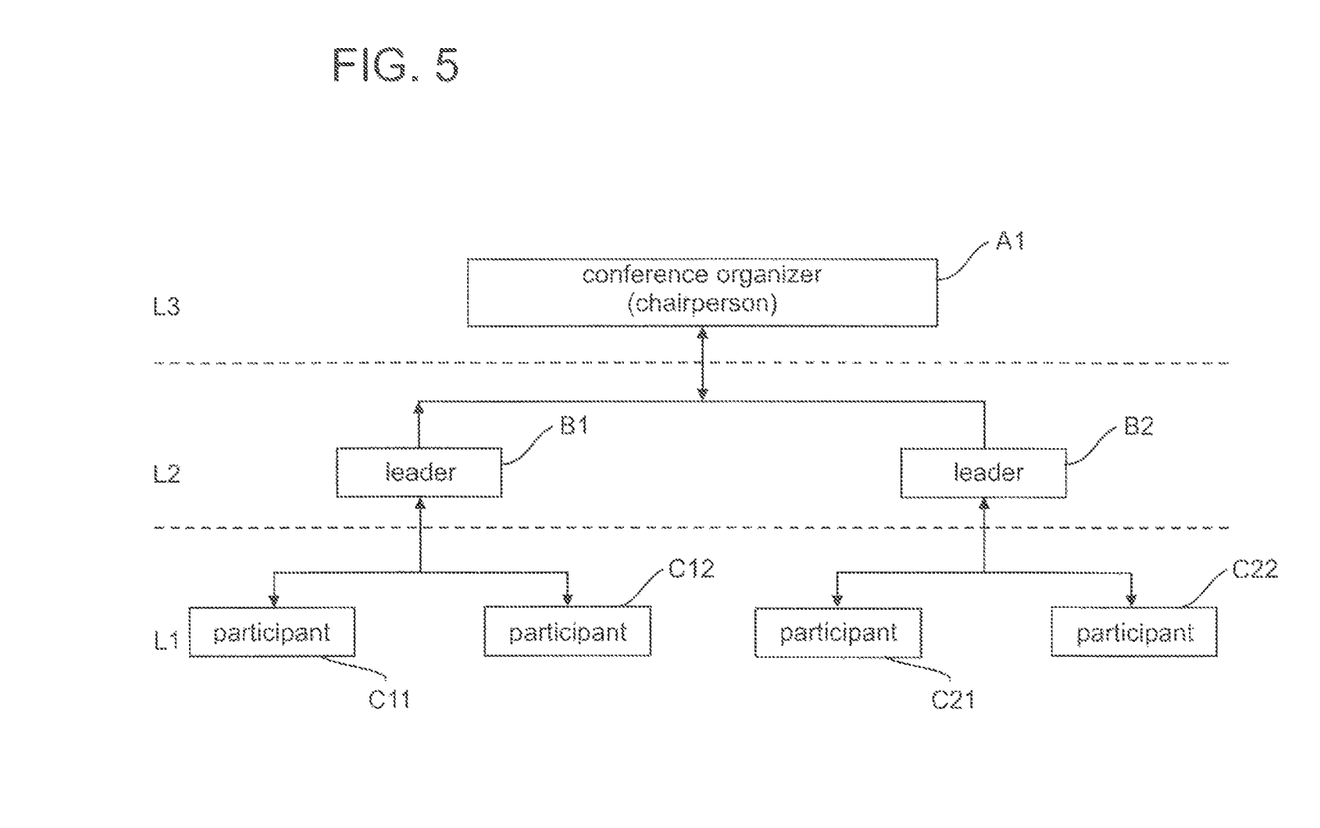
FIG. 5 is a schematic view of a hierarchical-tree structure of a conference according to an embodiment of the present invention.

For example, in a company's human resources database, there can be more than five levels, with the company's general manager at the highest level and employees at the lowest level. However, to hold a web conference attended by the staff of the company, the conferencing module 114 can simplify the hierarchical-tree structure by reducing the aforesaid five levels thereof to three levels L1-L3 and integrate the originally vertical association according to the conference organizer's setting. Referring to FIG. 5, for example, the general manager (acting as the conference organizer or chairperson) A1 is positioned at the highest level L3, and each of department heads (acting as leaders) B1 and B2 at the intermediate level L2 has an upward vertical association with the general manager A1. Other employees (acting as ordinary participants) C11, C12, C21 and C22 at the lowest level L1 have an upward vertical association with the department heads B1 and B2, respectively. Furthermore, the conference rights provided to participants by the conferencing module 114 depend on participants' positions at the three levels of the hierarchical-tree structure and the upward/downward vertical association between the participants.

For example, the department head (the leader) B1 at the intermediate level L2 is entitled to the conference right of initiating an internal seminar to be held while a conference is underway, and the conference right of authorizing, through the conferencing module 114, the department-affiliated employees C11 and C12 lying at the lowest level L1 and having a vertical association with the department head B1 to participate in the internal seminar. The internal seminar could be held synchronously with the original web conference. To prevent the internal seminar from interfering with the original web conference, the internal seminar could be conducted solely by text messages. For example, the conferencing module 114 enables the department head B1 to create a chat room on the server 110 and then invite the department-affiliated employees C11 and C12 (or invite only the department-affiliated employee C11) to join the chat room in order to attend the internal seminar, but prevent uninvited participants from attending the internal seminar or knowing what is discussed at the internal seminar. A point to note is that the way of conducting the internal seminar is not limited to a text-based chat; instead, the internal seminar can also be conducted by a video or audio means. However, preferably, the internal seminar is conducted by a video or audio input/output frequency channel or device which is different from the web conference in its entirety, for example, using different microphones or loudspeakers.

In other embodiments not shown, the conference organizer creates a hierarchical-tree structure dedicated to web conferencing, using the conference setting interface provided by the conferencing module 114, wherein the hierarchical-tree structure can have nothing to do with what happens to the participants beyond conferencing.

As described above, conference rights vary from participant to participant. In this regard, it is feasible for the conferencing module 114 to give a passcode to each of the participants (comprising the conference organizer and the leaders). In response to a participant's request to exercise his or her conference right, the conferencing module 114 verifies the participant's passcode, determines whether the participant is authorized to exercise the conference right, and, upon an affirmative determination, provides the requested conference right. In an embodiment, the passcode can also serve to permit the participants to log in the conferencing server 110.

A monitoring module 115 is connected to the conferencing module 114 and configured to monitor a status of participants (comprising the conference organizer, the leaders, or ordinary participants) in order to generate a status notification. In an embodiment, once all participants get connected, the monitoring module 115 may issue the status notification to the conference organizer (chairperson), so as to enable the conference organizer to announce the commencement of a conference. Statuses of participants comprise, but are not limited to, the following: participant's connection status (including connection/disconnection, connection stability, and connection bandwidth), mute status, status of behavior manifested by a participant to have an effect upon the process of the web conference and detectable by communication between the server 110 and the client device 120 of the participant, the participant's behavior status comprising a status of behavior that interferes with the process of the web conference, such as an interfering act intentionally or unwittingly committed by a participant during a session of presentation, or comprising a status independently declared by a participant, such as a one-minute break during a conference or a participant's request for support with regard to a technical glitch.

The control module 116 is connected to the conferencing module 114 and the monitoring module 115. In response to the detection that a participant has a specific status or a status change, the monitoring module 115 issues a status notification to the control module 116 in accordance with a preset setting. En response to the status notification issued by the monitoring module 115, the control module 116 issues a control command for requiring the conferencing module 114 to withhold specific conference rights from the participant and revoke a passcode previously given to the participant.

Given the three-level conference structure shown in FIG. 5, since the leader B1 or B2 at the intermediate level L2 usually enjoys more or broader conference rights than the participants at the lowest level L1 do, it is necessary to prevent the leader B1 or B2 from exercising conference rights unduly. To this end, the monitoring module 115 can, preferably but is not limited to, serve to monitor the status of the leader B1 or B2 and issue the status notification to the control module 116 and/or the conference organizer A1 at the highest level L3; hence, there is a vertical association between the conference organizer A1 and the leader B1 or 132. Once the monitoring module 115 detects that a specific status occurs to the leader B1 or B2, the control module 116 will issue the control command for requiring the conferencing module 114 to withhold conference rights from the leader B1 or B2. If the status notification is issued to the conference organizer A1 at the highest level L3, the conference organizer A1 will determine whether to cause the control module 116 to require the conferencing, module 114 to withhold conference rights from the leader B1 or B2. Likewise, once the monitoring module 115 detects that a specific status occurs to the participants C11-C22 at the lowest level L1, the control module 116 will require the conferencing module 114 to withhold conference rights from the participants C11-C22 at the lowest level L1. If the status notification is issued to the conference organizer A1 or the leader B1 or B2 who has a vertical association with the participants C11-C22, the conference organizer A1 or the leader B1 or B2 will determine whether to cause the control module 116 to require the conferencing module 114 to withhold conference rights from the participants C11-C22.

A substitute module 118 is connected to the control module 116. In an embodiment, after the control module 116 has required the conferencing module 114 to withhold conference rights from the leader (for example, the leader B1), the control command of the control module 116 further requires the substitute module 118 to generate a substitute procedure. The substitute procedure replaces the suspended leader B1 in exercising conference rights. Alternatively, the conference organizer A1 can determine whether to cause the control module 116 to require the substitute module 118 to generate the substitute procedure.

An exemplary program code for use with the monitoring module 115 and the control module 116 is hereunder provided for detecting for the disconnection or missing of the leader and then issuing a command to the substitute module 118 (known as redundancy in the program code).

```
int main ( ) {
    //keep checking
    while (!error) {
        //check if there is any missing leader
        Leader missingLeader = detectMissingLeader( )
        // missing leader detected
        if (missingLeader) {
            forkRedundancy(missingLeader);
        }
    }
}
```

In addition to the aforesaid exemplary embodiment, an exemplary program code for use with the substitute module 118 is further provided hereunder for generating a substitute procedure. The substitute procedure replaces the suspended leader in exercising conference rights. The leader's passcode is given to the substitute procedure. Moreover, the substitute procedure acquires data related to the properties of the leader in order to replace the leader in exercising conference rights.

```
void forkRedundancy (Leader missingLeader) {
//collect properties/passcode for new redundancy
LeaderProperties prop = getProperties(missingLeader);
    //fork the child process
    child = fork( );
    //the following part is for child process to be performed
    if (child = 0) {
        // Launch redundancy and set properties
        execv (redundancy, prop);
    }
}
```

In the above exemplary embodiment, after the monitoring module 115 has detected the disconnection or missing of the leader B1 or any other specific status (for example, seeking support with regard to a technical glitch) of the leader B1, the substitute module 118 generates a substitute program that replaces the leader B1 in exercising conference rights. Likewise, the monitoring module 115 may also detect the disconnection or missing of the conference organizer or the chairperson A1 or any other specific status (for example, seeking support with regard to a technical glitch) of the conference organizer or the chairperson A1, and, in response to the aforesaid result of detection, the substitute module 118 generates the substitute program that replaces the conference organizer in exercising conference rights, for example, sending break-related messages to other participants, or performing simple conference management according to some preset substitute rules.

In another embodiment, once the monitoring module 115 detects that a specific status (for example, disconnection or a request for support with regard to a technical glitch) occurs to the leader B1, not only can the control module 116 require the conferencing module 114 to withhold conference rights from the leader B1, but the control module 116 can also require the conferencing module 114 to grant conference rights to other participants for replacing the leader B1 in exercising conference rights so as to enable the conference to continue. In the aforesaid corporate exemplary embodiment, if the R&D department head acting as the leader B1 at the intermediate level L2 is suspended by the conferencing module 114, the conferencing module 114 may grant conference rights (especially ones involving the R&D department) to a senior R&D engineer C11 who is initially positioned at the lowest level L1 and has a vertical association with the leader B1. In other embodiments, the conferencing module 114 may also grant conference rights to the leader B2 (such as a sales department head) or even the conference organizer (general manager) A1.

To assign conference rights to other participants, the conferencing module 114 can transfer to a conference right transferee a passcode previously given to the suspended leader B1. Furthermore, the conferencing module 114 may determine the conference right transferee by making reference to an external database (such as the aforesaid human resources database), for example, determining the senior R&D engineer C11 (rather than the junior R&D engineer C12) eligible to replace the R&D head B1, according to the length of tenure in the department. Furthermore, the conference organizer (general manager) A1 may also determine whether to cause the control module 116 to require the conferencing module 114 to grant a conference right to the participant C11. Alternatively, the conference organizer (general manager) may determine a candidate (such as the participant C12, C21, or C22) for a conference right granted by the conferencing module 114.

If, after the conferencing module 114 has withheld conference rights from the leader B1, the monitoring module 115 detects that the leader B1 has had his/her specific status removed and his/her usual status restored, the monitoring module 115 may issue a status notification to the control module 116. Then, the control module 116 will revoke the control command previously issued, permit the conferencing module 114 to provide conference rights to the suspended leader B1 again, and recall the conference rights previously assigned. As a result, the substitute module 118 will terminate the execution of the substitute program.

Figure 6:
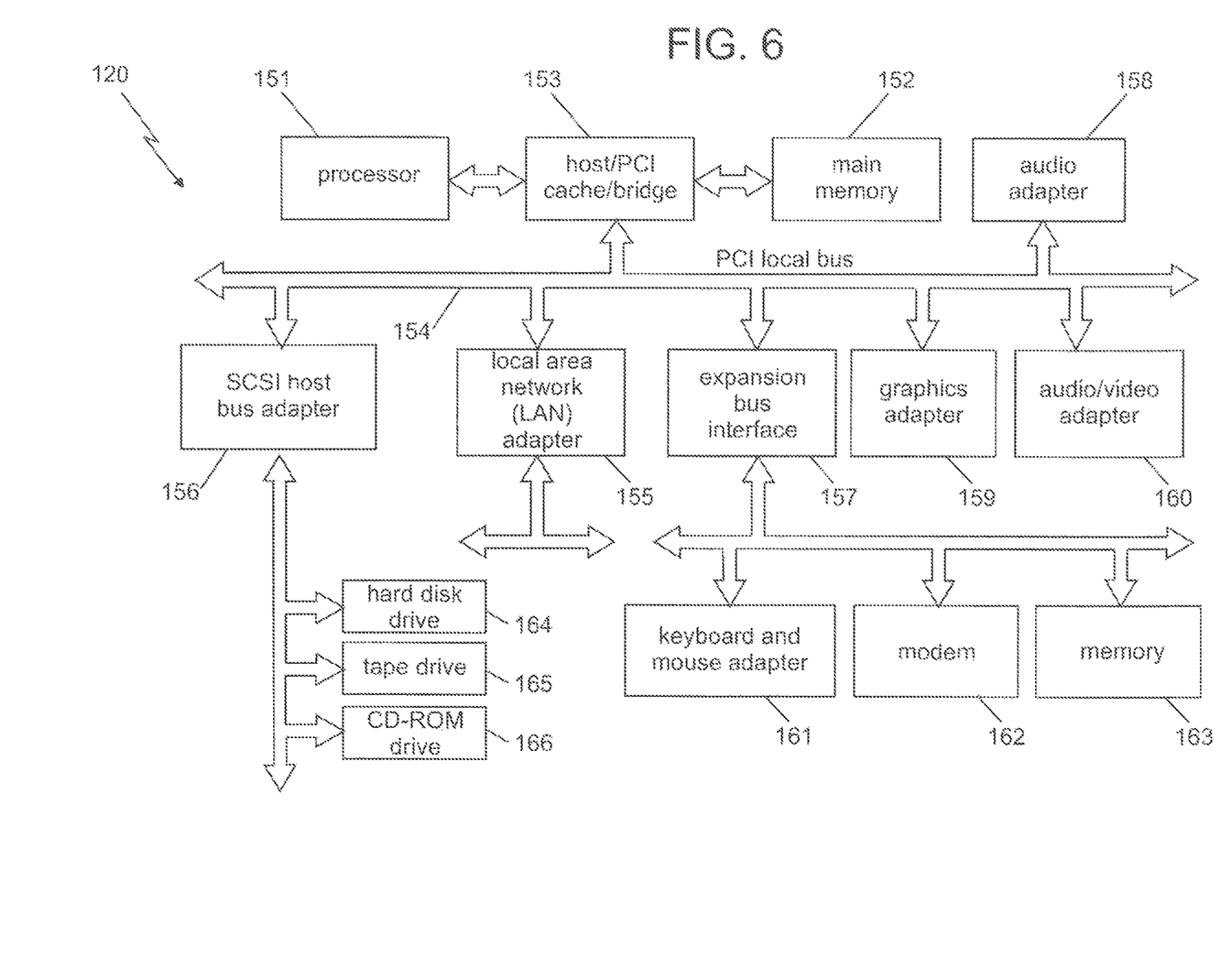
FIG. 6 is a block diagram of a client device according to an embodiment of the present invention.

FIG. 6 is an exemplary block diagram of a client device 120 according to one embodiment of the present invention. The client device 120 employs a peripheral component interconnect (PCI) local bus architecture. Although the depicted example employs a PCI bus, other bus architectures such as Accelerated Graphics Port (AGP) and Industry Standard Architecture (ISA) may be used. Processor 151 (e.g., a CPU of Intel Corporation or Advanced Micro Devices, Inc.) and main memory 152 are connected to PCI local bus 154 through PCI bridge 153. PCI bridge 153 also may include an integrated memory controller and cache memory for processor 151.

In the depicted example, local area network (LAN) adapter 155, small computer system interface (SCSI) host bus adapter 156, and expansion bus interface 157 are connected to PCI local bus 154 by direct component connection. In contrast, audio adapter 158, graphics adapter 159, and audio/video adapter 160 are connected to PCI local bus 154 by add-in boards inserted into expansion slots. Expansion bus interface 157 provides a connection for a keyboard and mouse adapter 161, modem 162, and additional memory 163. SCSI host bus adapter 156 provides a connection for hard disk drive 164, tape drive 165, and CD-ROM drive 166. Typical PCI local bus 154 implementations will support three or four PCI expansion slots or add-in connectors.

An operating system runs on the processor 151 and is used to coordinate and provide control of various components within the computer apparatus 120 and used to execute applications/programs with GUIs. The operating system may be a commercially available operating system such as WINDOWS XP® of Microsoft Corporation, which is a GUI characterized operation system. ("WINDOWS XP" is a registered trademark of Microsoft Corporation in the United States, other countries, or both.) Instructions for the operating system, and applications or programs are located on storage devices, such as the hard disk drive 164, and may be loaded into the main memory 152 for execution by the processor 151. The processor 151 also executes a client process to communicate with the server 110 via the network 180, through, for example the local area network adapter 155. Note that the client 120 and the server 110 may use the similar hardware architecture.

Figures 7, 7A:
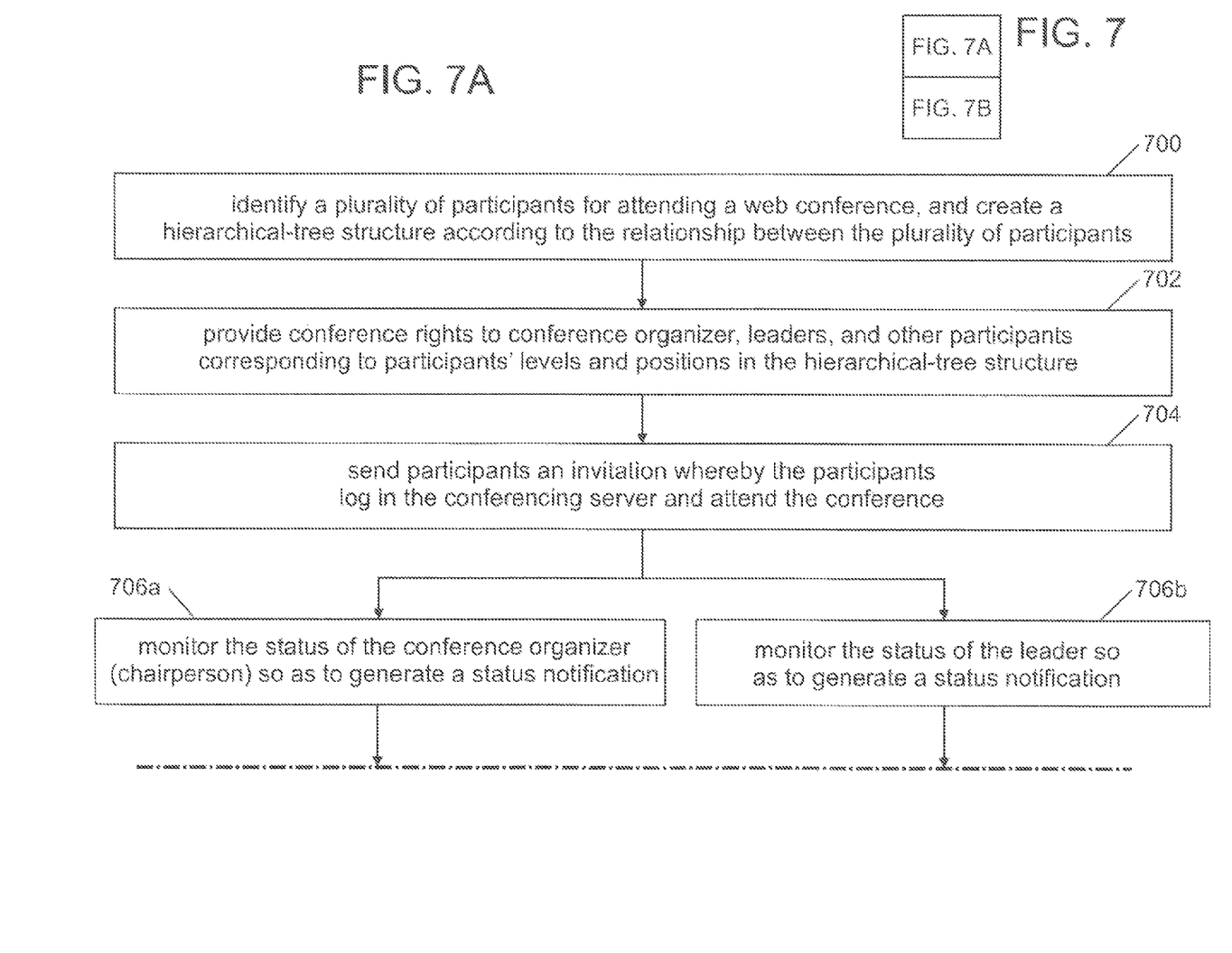
FIGS. 7, 7A and 7B is a flowchart of a method according to an embodiment of the present invention.
Figure 7B:
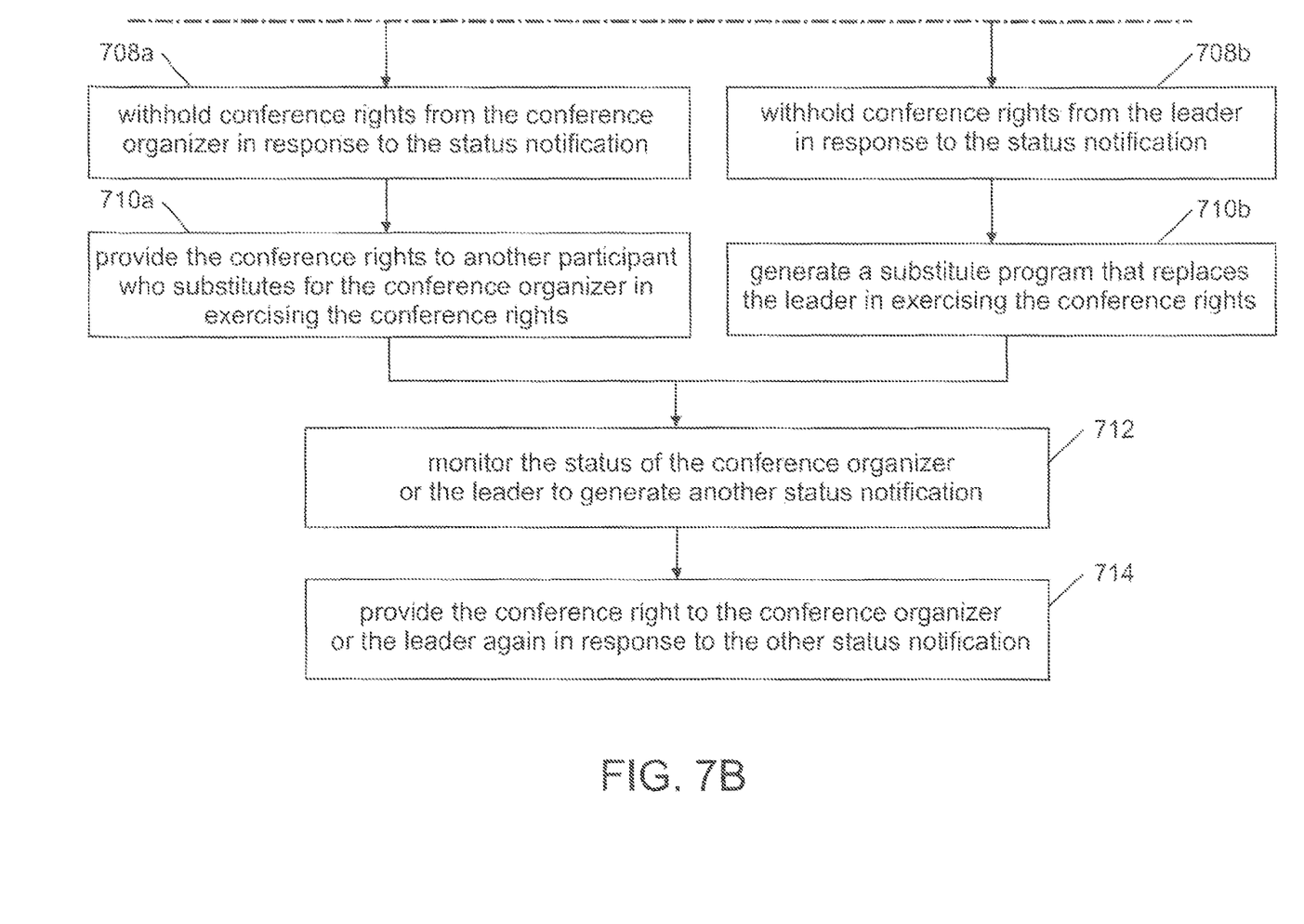

An embodiment of the present invention is further illustrated with the aforesaid web conferencing system and a flowchart shown in FIG. 7. As shown in FIG. 7, in step 700, a plurality of participants for attending a web conference are identified, and a hierarchical-tree structure (shown in FIG. 5) is created according to the relationship between the plurality of participants, for example, by adjusting the hierarchical-tree structure stored in the company's human resources database, or created by the conference organizer independently.

In step 702, the conference organizer A1, the leaders B1 and B2, and other participants C11-C22 are provided with conference rights corresponding to participants' levels and positions in the hierarchical-tree structure (such as levels L1-L3 shown in FIG. 5). For example, the conference organizer A1 is entitled to conference rights required to act as the chairperson, and the leaders B1 and B2 are entitled to conference rights toward the participants C11-C12 and the participants C21-C22, respectively. For example, the leader B1 is entitled to the right of initiating an internal seminar in addition to the web conference and the right of requiring the participants C11, C12 to attend the internal seminar.

In step 704, the conferencing module 114 sends invitations to participants. The invitations describe a login procedure and contain the participants' exclusive passcodes. The participants use the received passcodes to log in the conferencing server and attend the conference.

In an embodiment, the monitoring module 115 monitors the status of the conference organizer (chairperson) A1, such that, upon detection that, for example, the chairperson A1 is disconnected/missing, or is seeking support with regard to a technical glitch, the monitoring module 115 generates a status notification (step 706*a*). Then, in step 708*a*, the conferencing module 114 temporarily withholds conference rights from the chairperson A1, because the chairperson A1 is not capable of full participation in the conference as indicated by the status notification generated by the monitoring module 115. In step 710*a*, the conferencing module 114 chooses, by making reference to a preset rule, another participant (the leader B1 or the participant C11) to substitute for the chairperson A1, and transfers conference rights (and a passcode) from the chairperson A1 to the "substitute chairperson" (the leader B1 or the participant C11). In this step, the conferencing module 114 presents to the "substitute chairperson" the status that occurs to the original chairperson A1 and requests the "substitute chairperson" to confirm acceptance of the conference rights of the chairperson A1.

In another embodiment, the monitoring module 115 monitors the status of the leader B1, and, upon detection that the leader B1 is disconnected/missing or is seeking support with regard to a technical glitch for example, the monitoring module 115 generates the status notification (step 706*b*). Afterward, in step 708*b*, the conferencing module 114 temporarily withholds conference rights from the leader B1, because the leader B1 is not capable of full participation in the conference as indicated by the status notification generated by the monitoring module 115. In step 710*b*, the substitute module 118 generates the substitute program that replaces the leader B1 in exercising conference rights, for example, sending to the chairperson A1 a message that the participants C11 and C12 have been connected. Note that either substitute program described above or another substitute program may be employed for each of the chairperson and the leaders, or other participants with conferencing rights.

After step 710*a* or 710*b*, the monitoring module 115 continues to monitor the status of the conference organizer (chairperson) A1 or the leader B1, and, upon detection that the chairperson or the leader B1 has had his/her specific status removed and his/her usual status restored (for example, getting connected again or having solved a technical problem), the monitoring module 115 generates a new status notification (step 712). The conferencing module 114 provides a conference right to the chairperson A1 or the leader B1 again in response to the new status notification (step 714).

The description shown above is only exemplary of the preferred embodiments of the present invention and is not intended to limit the scope of the invention. Any equivalent variations or modifications without departing from the spirit disclosed by the present invention should be included in the appended claims.

The invention claimed is:

1. A web conferencing server, comprising:
 a processor;
 a memory operably connected to the processor;
 a conferencing module for enabling a plurality of participants to attend a web conference and providing a conference fight to only a first participant of said plurality of participants;
 a monitoring module connected to said conferencing module and configured to monitor a status of said first participant in order to generate a status notification, the monitoring including automatically monitoring a connection status of said first participant;
 a control module connected to said conferencing module and said monitoring module and configured to issue, in response to said status notification, a control command to said conferencing module, to withhold said conference right from said first participant; and
 a substitute module connected to said control module, wherein said control command further requires said substitute module to generate a substitute procedure, such that said substitute procedure replaces said first participant and exercises said conference right,
 wherein said conferencing module, monitoring module, control module, and substitute module are computer program instructions stored on said memory and executable by the processor.

2. The server of claim 1, wherein said plurality of participants comprise a second participant, and, in response to said status notification, said control command further requires said conferencing module to provide said conference right to said second participant for exercising said conference right.

3. The server of claim 2, wherein said conferencing module selects said second participant according to a preset rule.

4. The server of claim 1, wherein said plurality of participants comprise a third participant, and said monitoring module shows said status notification to said third participant, and said third participant determines whether to start said control module.

5. The server of claim 1, wherein, after issuing said control command, said control module revokes said control command in response to another status notification of said monitoring module.

6. The server of claim 1, wherein said conferencing module enables said plurality of participants to hold said web conference in a hierarchical-tree structure and divides said plurality of participants into a plurality of levels, and said first participant is of a level higher than the lowest level in said hierarchical-tree structure.

7. The server of claim 6, wherein said plurality of participants comprise a second participant, and, in response to said status notification, said control command further requires said conferencing module to provide said conference right to said second participant,
 wherein said second participant and said first participant are of different levels with a vertical association in said hierarchical-tree structure.

8. The server of claim 7, wherein said first participant is of a higher level than said second participant.

9. The server of claim 6, wherein said conference right is associated with said level of said first participant.

10. The server of claim 1, wherein said conferencing module further provides each participant with an exclusive passcode for logging into said server.

11. The server of claim 1, wherein said conferencing module divides said plurality of participants into a plurality of levels;
   wherein said plurality of participants comprises said first participant, a second participant, and a third participant, and said conferencing module arranges said first participant and said second participant into different levels with a vertical association in a hierarchical-tree structure; and
   wherein, during said web conference, said conferencing module further enables said first participant and said second participant to attend a second web conference and excludes said third participant from said second web conference.

12. A method for holding a web conference, comprising the steps of:
   identifying a plurality of participants for attending said web conference, said plurality of participants comprising a first participant;
   providing a conference right to only said first participant;
   monitoring a status of said first participant in order to generate a status notification, the monitoring including automatically determining a connection status of said first participant;
   withholding said conference right from said first participant in response to said status notification; and
   generating a substitute procedure, such that said substitute procedure replaces said first participant and exercises said conference right.

13. The method of claim 12, wherein, in the identifying step, said plurality of participants further comprise a second participant, and the withholding step further comprises the step of providing said conference right to said second participant for exercising said conference right.

14. The method of claim 13, wherein the identifying step further comprises the step of selecting said second participant according to a preset rule.

15. The method of claim 12, wherein, in the identifying step, said plurality of participants further comprise a conference organizer, the monitoring step further comprises the step of showing said status notification to said conference organizer, and the withholding step further comprises the step of receiving from said conference organizer a determination of whether to withhold said conference right from said first participant.

16. The method of claim 12, further comprising, after the withholding step, the steps of:
   monitoring another status of said first participant in order to generate another status notification; and
   providing said conference right to said first participant again in response to said another status notification.

17. The method of claim 12, wherein the identifying step further comprises the step of dividing said plurality of participants into a plurality of levels, and said first participant being of a level higher than the lowest level in a hierarchical-tree structure in which the plurality of participants are organized.

18. The method of claim 17, wherein, in the identifying step, said plurality of participants further comprise a second participant, such that said second participant and said first participant are of different levels with a vertical association in said hierarchical-tree structure, and the withholding step further comprises the step of providing said conference right to said second participant.

19. The method of claim 18, wherein, in the identifying step, said first participant is of a higher level than said second participant.

20. The method of claim 17, wherein, in the providing step, said conference right is associated with said level of said first participant.

21. The method of claim 12, wherein the identifying step comprises identifying said plurality of participants for attending a first web conference in a hierarchical-tree structure, said plurality of participants comprising said first participant, a second participant, and a third participant, and further comprising the steps of:
   dividing said plurality of participants into a plurality of levels and arranging said first participant and said second participant into different levels with a vertical association in said hierarchical-tree structure; and
   attending, by said first participant and said second participant, a second web conference during said first web conference, and excluding said third participant from said second web conference.

22. A computer program product comprising a tangible computer-readable storage device having encoded thereon a program of instructions, comprising:
   computer program instructions to identify a plurality of participants for attending a web conference, said plurality of participants comprising a first participant;
   computer program instructions to provide a conference right only to said first participant;
   computer program instructions to monitor a status of said first participant in order to generate a status notification, the monitoring including automatically monitoring a connection status of said first participant;
   computer program instructions to withhold said conference right from said first participant and provide said conference right to a second participant in response to said status notification; and
   computer program instructions to generate a substitute procedure, such that said substitute procedure replaces said first participant and exercises said conference right.

* * * * *